(12) United States Patent
Yeoman et al.

(10) Patent No.: US 11,398,047 B2
(45) Date of Patent: Jul. 26, 2022

(54) VIRTUAL REALITY SIMULATIONS USING SURFACE TRACKING

(71) Applicant: Nvidia Corporation, Santa Clara, CA (US)

(72) Inventors: Gordon Yeoman, Santa Clara, CA (US); Michael Sauter, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 56 days.

(21) Appl. No.: 16/888,408

(22) Filed: May 29, 2020

(65) Prior Publication Data

US 2020/0380714 A1 Dec. 3, 2020

Related U.S. Application Data

(60) Provisional application No. 62/854,850, filed on May 30, 2019.

(51) Int. Cl.
| | |
|---|---|
| *G06T 7/70* | (2017.01) |
| *G06F 9/38* | (2018.01) |
| *G06T 19/00* | (2011.01) |
| *G06T 15/00* | (2011.01) |

(52) U.S. Cl.
CPC .............. *G06T 7/70* (2017.01); *G06F 9/3877* (2013.01); *G06T 15/005* (2013.01); *G06T 19/006* (2013.01)

(58) Field of Classification Search
CPC ........ G06T 7/70; G06T 19/006; G06T 15/005
See application file for complete search history.

(56) References Cited

U.S. PATENT DOCUMENTS

| | | | |
|---|---|---|---|
| 7,381,153 B2 | 6/2008 | Couvillion, Jr. et al. | |
| 8,031,906 B2 | 10/2011 | Fujimura et al. | |
| 9,600,067 B2 | 3/2017 | Kumar et al. | |
| 2004/0104935 A1 | 6/2004 | Williamson et al. | |
| 2013/0016070 A1* | 1/2013 | Starner | G02B 27/017 345/175 |
| 2014/0267189 A1* | 9/2014 | Moll | G06F 3/04886 345/179 |
| 2015/0042680 A1* | 2/2015 | Grossinger | G06F 3/017 345/633 |
| 2015/0235453 A1 | 8/2015 | Schowengerdt et al. | |
| 2015/0294439 A1* | 10/2015 | Watanabe | G01B 11/14 345/619 |
| 2016/0260251 A1 | 9/2016 | Stafford et al. | |
| 2016/0335486 A1 | 11/2016 | Fleishman et al. | |

(Continued)

*Primary Examiner* — Samantha (Yuehan) Wang

(57) ABSTRACT

The disclosure provides a system to render a virtual reality (VR) scene, and a method and computer program product to determine a follower pose in a VR simulator during a simulation step. In one example, the method includes: (1) computing one or more current candidate poses utilizing input parameters, wherein each of the current candidate poses is a temporal projection of a follower pose along a respective sweep direction towards a leader pose, and wherein an obstruction is located between the follower pose and the leader pose, (2) selecting a target pose from the one or more current candidate poses, (3) refining the target pose utilizing physics-based constraints and the input parameters, wherein the physics-based constraints use a surface of the obstruction, and (4) rendering a new follower pose based on the refined target pose.

23 Claims, 6 Drawing Sheets

(56) References Cited

U.S. PATENT DOCUMENTS

2019/0347372 A1* 11/2019 Ebstyne ................. G10L 15/01
2020/0122321 A1*  4/2020 Khansari Zadeh .... B25J 9/1697
2020/0345433 A1* 11/2020 Peine ..................... A61B 34/30

* cited by examiner

VIRTUAL REALITY SIMULATIONS USING SURFACE TRACKING

CROSS-REFERENCE TO RELATED APPLICATION

This application claims the benefit of U.S. Provisional Application Ser. No. 62/854,850, filed by Gordon Yeoman, et al. on May 30, 2019, entitled "VIRTUAL REALITY SIMULATIONS USING SURFACE TRACKING," commonly assigned with this application and incorporated herein by reference.

TECHNICAL FIELD

This application is directed, in general, to virtual reality simulation and, more specifically, to simulating movement of objects in a virtual reality environment when the objects interact with obstructions.

BACKGROUND

In virtual reality (VR) systems, sensors are employed to track a user's motion to enable that motion to be replicated within a simulated environment. Objects, characters, animals, plants, and other obstructions displayed in the simulated environment by a VR simulator are typically not present in the user's physical space, e.g., the area physically around the user. As a result, a user may make a motion or movement in their physical space that could break the illusion of the simulated environment. For example, a user can thrust their hand forward without encountering an obstruction in their physical space, while in the simulated environment their hand penetrates a wall in front of them. This unrealistic occurrence in the simulated environment can degrade a user's virtual experience.

SUMMARY

In one aspect, the disclosure provides a method to determine a follower pose in a virtual reality (VR) simulator during a simulation step. In one example, the method includes: (1) computing one or more current candidate poses utilizing input parameters, wherein each of the current candidate poses is a temporal projection of a follower pose along a respective sweep direction towards a leader pose, and wherein an obstruction is located between the follower pose and the leader pose, (2) selecting a target pose from the one or more current candidate poses, (3) refining the target pose utilizing physics-based constraints and the input parameters, wherein the physics-based constraints use a surface of the obstruction, and (4) rendering a new follower pose based on the refined target pose.

In another aspect, the disclosure provides a computer program product having a series of operating instructions stored on a non-transitory computer-readable medium that directs a data processing apparatus when executed thereby to perform operations to determine a follower pose in a VR simulator during a simulation step. In one example, the operations include: (1) computing one or more candidate poses, wherein each of the candidate poses is a temporal projection of a follower pose along a respective sweep direction towards a leader pose, and wherein an obstruction is located between the follower pose and the leader pose, (2) selecting a target pose from the one or more candidate poses, (3) refining the target pose utilizing physics-based constraints, and (4) rendering a new follower pose based on the refined target pose.

In yet another aspect, the disclosure provides a system to render a VR scene. In one example the system includes: (1) a VR controller, operable to transmit user parameters corresponding to movement of a user, and (2) a VR simulator, operable to receive and use the user parameters and application parameters to render a scene of a simulated environment utilizing one or more movement algorithms based on an interaction of a leader pose with an obstruction, wherein the leader pose represents the movement of the user in the simulated environment and the obstruction is at least partially between a follower pose and the leader pose in the simulated environment.

BRIEF DESCRIPTION

Reference is now made to the following descriptions taken in conjunction with the accompanying drawings, in which.

DETAILED DESCRIPTION

Figure 1A:
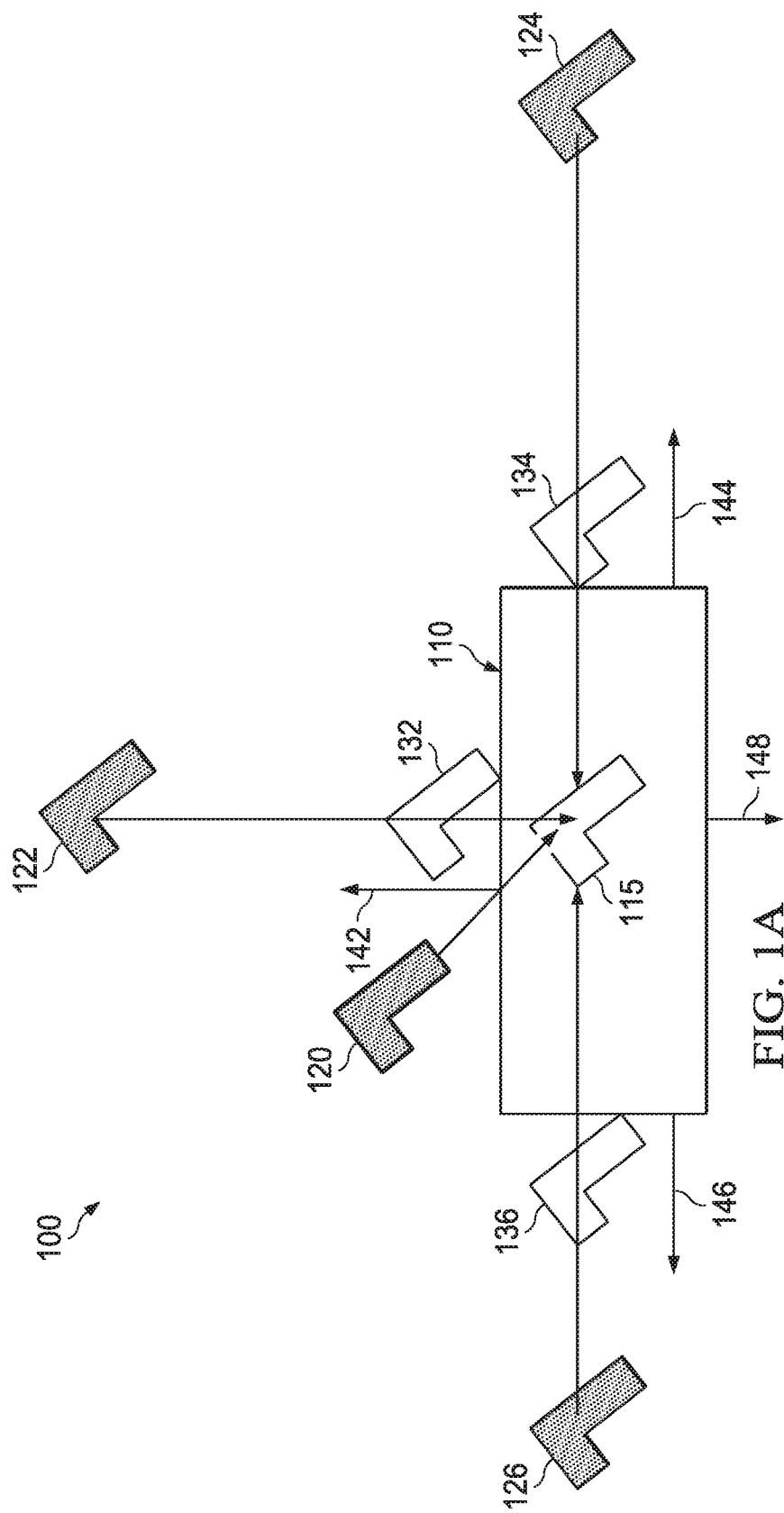
FIG. 1A is an illustration of a diagram of an example candidate pose analysis in a 2D environment.

A VR simulator can depict a VR environment, i.e., a simulated environment, of various types of settings, locations, scenes, etc., that is provided to a user via a VR display, and allow a user to perform a wide variety of actions and motions, i.e., movements, in the physical space that are replicated in the simulated environment. The VR display can be a VR headset, glasses, or another type of display capable of showing two-dimensional (2D) or three-dimensional (3D) simulated environments. The movements made by a user can be captured by one or more VR controllers, such as a headset that tracks eye and head movements, a handheld controller, a camera, a haptic device, and other types of body and sensor controllers.

Since a VR simulator can create a simulated environment that is different from the user's physical environment, e.g., the physical space around the user, the user can initiate a movement in the physical environment that is unrealistic in the simulated environment, such as moving their hand through an obstruction in the simulated environment. An obstruction can be an object, character, animal, plant, fluid, or other types of physics-based objects that can prevent or alter the movement of another object. The wall as noted above is an example of an obstruction that can be present within the simulated environment.

While simulating an unrealistic movement, such as, showing the user's hand moving through a solid wall can interrupt a user's VR experience, preventing the user from completing the movement in the simulated environment can also negatively affect the VR experience by causing disorientation. For example, as a user's hand is thrust forward in their physical space, the simulated environment can simulate the user's hand stopping at a wall an inch in front of the user. Another unsatisfactory solution is to allow the user's hand to move through the obstruction within the simulated environment, while objects the user may be holding or carrying are stopped by the obstruction. This type of movement handling can be described as jointed picking with penetration avoidance. As such, a user's virtual experience can be improved by improving the interaction of objects and obstructions in simulated environments.

The disclosure provides systems and methods that enable controlling the motion of an object in a virtual environment to prevent the object from penetrating an obstruction in the virtual environment. Instead, of penetrating the obstruction, the features disclosed herein moves the object along a surface of the obstruction that appears believable and plausible to a user. Methods are disclosed herein that use a combination of rigid body algorithms and geometric queries to compute potential movements that approximate the movement of a user (as tracked by a sensor), while maintaining physics-based constraints of obstructions within the simulated environment. A constraint is a factor that controls the movement of objects in the simulated environment. Similar to a guardrail on a highway, a constraint can control movement along a designated path. The physics-based constraints can include the constraints of the moving object or character (for example, speed, velocity, and momentum), the constraints of interacting with a surface of an obstruction (for example, surface rigidity, bounce, and texture), external constraints, rigid body constraints (for example, strong solids may not bend under minor force), and other physics-based constraints available within a VR simulator. An example of an external constraint can be that a hand cannot be forced to bend in an unnatural way when hitting an obstruction. A simulated hand connected to an arm can conform to the constraints imposed by the finger, wrist, and arm positioning, torque, and flexibility parameters. Constraints can follow rules established by a user, by an application, or by a VR simulator. The constraints do not have to follow what is experienced in real life; the physics-based constraints can be established by the application running the simulated environment. The application can be a video game application.

When creating a simulated environment, a VR simulator balances a requested movement from a user and the constraints imposed by an obstruction, e.g., satisfy the force of the user's movement and the contact force of the obstruction preventing the movement, such as pushing a hand against a wall. A follower-leader pose structure is one technique that can be used according to the principles of the disclosure. A follower pose is the position, location, and orientation of an object at a starting point. A leader pose is the position, location, and orientation of an object at the point requested through the movement of the user. For example, at a point within the simulation, a character's hand is held above a tabletop. That position and orientation of the hand is the follower pose. The user moves their hand down. Within the simulated environment, the leader pose is the simulated hand now positioned and oriented below the tabletop, e.g., the destination of the movement. The follower pose is the position, location, and orientation of the object that is rendered for the user to see on the VR display. The leader pose is used to track movement of objects and is not typically rendered for the user.

The VR simulator can move the follower pose until it hits, e.g., intersects, with an obstruction, in this case, the tabletop. The direction in which the follower pose is moved is the sweep direction. The result is that the follower pose is now located against the obstruction, e.g., called a blocking pose. This type of solution can be limiting. For example, if the simulated hand of the user is close to an edge of the tabletop, a better visual experience for the user is to have the simulated hand move slightly to the side and slide around the corner of the tabletop, e.g., called a stroking pose—where the movement strokes the surface of the obstruction. Surface stroking is the movement of the follower pose, just outside of the surface of the obstruction, moving along the surface of the obstruction, while the leader pose can be just above, at, or just below the surface of the obstruction. For example, a user tracing their hand over the surface of an automobile. This can result in a smoother visual experience by the user.

The combination of blocking poses and stroking poses allow the follower pose to follow the leader pose in a physically plausible manner within the simulated environment. Blocking poses, implemented using blocking algorithms, can cause the follower pose to stick at the initial blocking point of the obstruction. Solely using blocking algorithms can fail to follow the lateral, sidewise, movement of the leader pose. Stroking poses, implemented using stroking algorithms, can cause the follower pose to track the lateral movement of the leader pose while not maintaining the surface boundary of the obstruction. Therefore, the movement can satisfy the constraints of the blocking algorithms and stroking algorithms.

In some aspects using blocking algorithms without stroking algorithms can be beneficial, such as in cases where the obstruction is the size, or smaller than, the follower pose. For example, it can be more efficient to stop (blocking) a moving hand at a small control knob rather than attempting to move it around (stroking) the control knob. This can be determined by using a sweep mode ratio of the size of the moving object, such as the hand, and the size of the obstruction, such as the control knob. Technically, the sweep mode ratio can be defined as a radius of a bounding sphere of the obstruction that can be compared (put on top in a ratio) to a radius of a bounding sphere of the follower geometry. If the sweep mode ratio is larger than a sweep mode parameter, such as 1.0 or another real number, then the blocking and stroking algorithms can be utilized. If the sweep mode ratio is equal to or smaller than the sweep mode parameter, the blocking algorithm can be utilized without the stroking algorithm. This aspect can reduce the computational complexity for the movement being simulated.

A VR simulator can be configured to perform the various steps of the disclosed method for moving an object in the simulated environment. As the user moves, the VR simulator can generate the visual representation in the simulated environment in small steps called simulation steps. The number of simulation steps can depend on several factors, such as the amount of computing system resources available (the more resources available, the more steps that can be generated within a time period), the visual quality set by the application (the higher the visual quality, the more computing resources that will be used), and the number of updates made to the visual representation over a time duration, e.g., seconds, as requested by the application or the user (the higher the number of updates, the more computing resources that may be used).

The VR simulator can use a parameter, such as frames per second (FPS), to indicate how many visual representations, i.e., scenes, are to be generated per second for output to the VR display. Typical ranges of the FPS can be 60 FPS to 120 FPS, and some VR simulators can use a lower or higher FPS. This means that the VR simulator can output between 60 to 120 updates of the scene each second. The number of simulation steps used by the VR simulator during a time duration, e.g., seconds, can be defaulted to the FPS. Other factors, such as VR simulator optimizations and available computing resources, can adjust the number of simulation steps higher or lower. At a time when the VR simulator increments the simulation step, new information can be calculated using the current requested movement of the user, and a new scene can be output to the VR display.

The VR simulator can generate the scene, i.e., render the scene, or use a separate rendering system. A renderer generates an image or scene from scene data that represents the 2D or 3D simulated environment and can output the rendered scene to a display device or a storage device. A renderer can be implemented as a software application, a processor, a computing system that receives instructions and outputs the scene, or a combination thereof. The processor can be a parallel processor, such as graphics processing unit (GPU), or a serial processor, such as a central processing unit (CPU). A combination of one or more processors can also be used.

For example, the rendering process can be divided between a general purpose CPU and a graphics processing subsystem, architecturally centered about a GPU. The CPU can perform high-level operations, such as determining the position, motion, and collision of objects and obstructions in a given scene. From these high-level operations, the CPU generates a set of rendering commands and data defining the desired rendered image or images. The rendering commands and data can define scene geometry, lighting, shading, texturing, motion, and/or camera parameters for a scene. From the set of rendering commands and data, the graphics processing subsystem can create one or more rendered scenes.

The renderer can employ ray-traced rendering techniques for rendering. Ray tracing is an example of a technique used for rendering scenes in a rendering pipeline; especially when the scenes include complex lighting. Ray tracing describes any number of techniques used for efficiently resolving visibility along a straight line between any two arbitrary points in a scene, wherein the visibility information is used to resolve light transport and light interactions with materials in the scene. For example, ray tracing can extend a line, i.e., a ray, from a user's view perspective to an object within the scene, and then determining a second ray from that object to a light source or to another object of the scene. These rays can then be used to determine the amount of light hitting the objects (including indirect lighting and reflections), the angle of the light to the user's view perspective, and how the color, texture, and other characteristics of objects and obstructions are represented to the user.

Processing of the rays for ray-traced rendering can be performed in parallel by a single processor or by multiple processors, such as different GPUs, and is applicable to both local and remote computing. As such, the rendering can be performed by a cloud-based renderer that provides rendered frames for remote users. In parallel as used herein includes at least partially in parallel and indicates that processing is occurring in parallel paths but not necessarily simultaneously.

A cloud-based renderer can be implemented on a server or on multiple servers of a cloud computing platform that include the one or more processors and additional components, such as a memory and a communications interface. An image processor can receive rendered scenes from the cloud-based renderer and encode the scenes into one or more video streams that are provided to a video transmitter for transmission to computing devices, such as VR displays, over a communications network. Through this cloud-based technology, users can receive a video stream and enjoy a virtual graphics experience on their computing devices. For example, a video game application can provide input to a cloud-based renderer for rendering and streaming of the game to computing devices of one or more users. Inputs from a VR controller can also be received for the rendering and game streaming. Game streaming allows a user to control and play a game that is rendered remotely from their input device, such as a VR controller. The cloud-based rendering platform and game streaming can allow users to remotely compete against others in a video game over a communications network.

Whether the simulation is performed using a cloud-based renderer or a renderer located proximate the VR display or controller, the movement of an object can be represented by two separate poses in the simulated environment. A follower pose typically remains on the outside of the surface of the obstruction and is the original position and orientation of the moving object for a current simulation step. A leader pose represents a result from the movement when unconstrained. In addition, the disclosure utilizes candidate poses, which are potential poses determined by geometric queries, such as sweeps. The candidate poses are used to compute an approximate target pose that is then refined through rigid body physics simulation resulting in a refined target pose. As with the candidate poses, the approximate target pose is computed using geometric queries. The movement of the follower pose to the refined target pose is accomplished through rigid body physics simulation. Rigid body physics simulation can utilize forces, joint drives, and velocity factors in its algorithms to move the follower pose to the refined target pose. A physics engine, such as physics engine 740 of FIG. 7, can be used to provide the rigid body physics simulation.

In a single simulation step performed by the VR simulator, the follower pose is moved toward the target pose. Depending on the size of the simulation step, the velocity of the movement, and the various constraints used, the follower pose may not achieve the target pose and therefore stop part of the way toward the target pose. The follower pose can chase the leader pose, such as when the movement is sufficiently fast within the constraints of the simulated environment so that the follower pose does not reach the leader pose. In a subsequent simulation step, a new leader pose can be determined, along with corresponding new candidate poses, and hence, a new target pose selected. For example, a user moving their fist very quickly may see the scene update with the fist part of the way toward where the user has moved their fist. In a subsequent simulation step, a new target pose can be selected utilizing the then current position of the fist.

Within the simulation step, the VR simulator can drive the follower pose by the movement of the leader pose according to four computational phases. The first phase can be to sweep the movement from the follower pose to the leader pose and record the intersection point and geometric normal, i.e., intersection normal, of any obstruction that blocks the sweep. This can approximate a candidate pose that is close to the leader pose while maintaining the surface blocking constraint of the obstruction.

The first phase can be more efficient by selecting a candidate pose that is near the leader pose as opposed to a candidate pose that is closest to the leader pose. The goal is to identify and select a target pose from the pool of candidate poses that sufficiently satisfies the various constraints within a smaller number of sweeps. Merely selecting a target pose from the candidate poses that is closest to the leader pose can lead to visual artifacts such as in cases where another candidate pose is selected or if a cyclic flipping between two or more similarly close candidate poses occurs. Creating a weighted average of candidate poses can also lead to visual artifacts, such as jittering. The jittering can be reduced by applying additional temporal smoothing techniques.

In the first phase, one or more candidate poses can be computed, where each candidate pose is a temporal projection of the follower pose along a respective sweep direction. Sweep directions are first selected for computing the candidate poses.

Figure 1B:
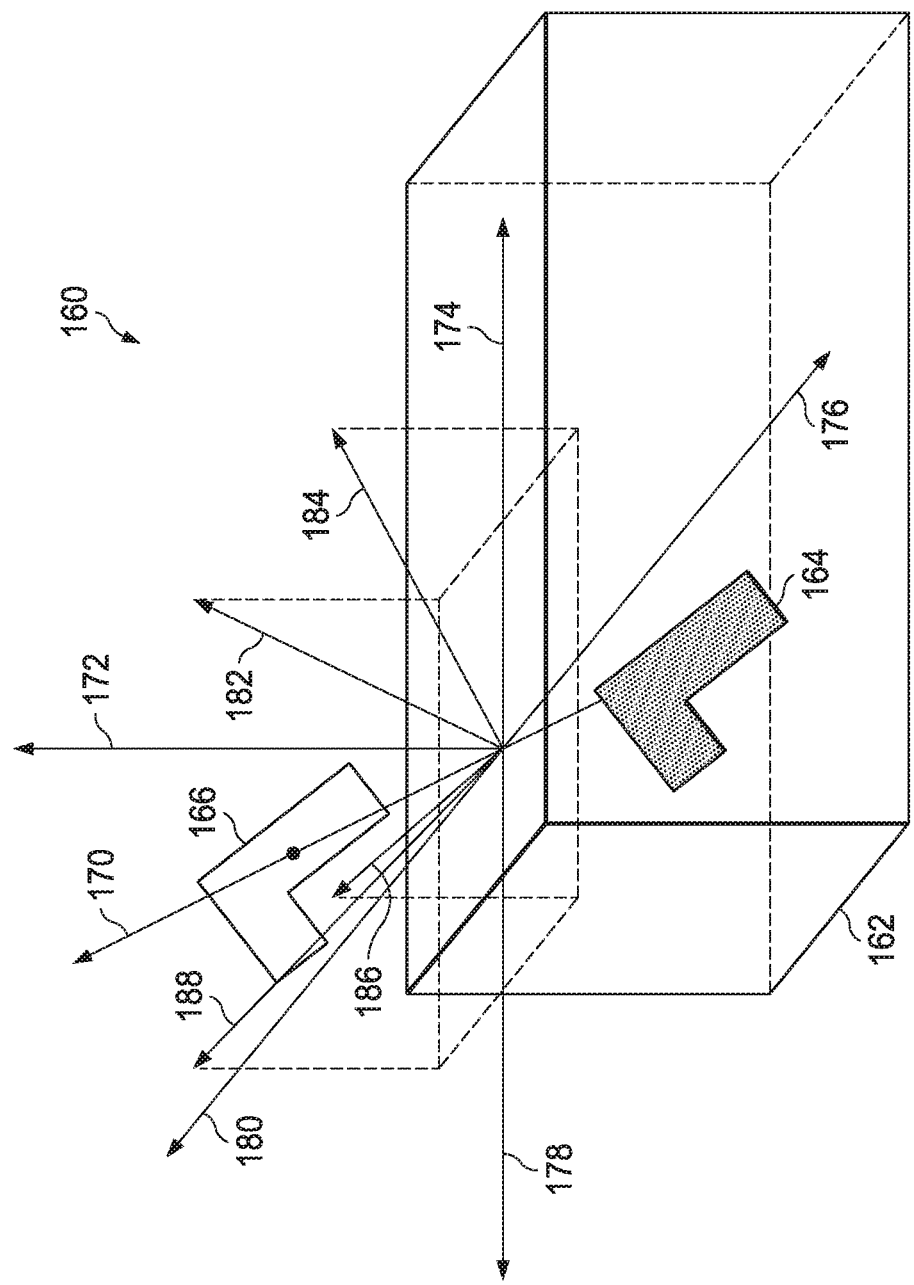
FIG. 1B is an illustration of a diagram of an example candidate pose analysis in a 3D environment.

A sampling of the obstruction surface surrounding the leader pose can be selected from the intersection normal and direction of the original sweep (from the follower pose), by sweeping towards the leader pose from a variety of directions. To increase temporal coherence, the normal can be blended with the normals of previous simulation steps, where the number of previous simulation steps to review can be determined by the second phase algorithm, simulated environment, application, or user, for example, the past two or five simulation steps. These sampling sweeps can reveal multiple candidate poses that places the follower pose close to the outside surface of the obstruction. Each sweep can provide one candidate pose. The selected sweep directions can include directions along the original sweep direction (blocking algorithm), directions perpendicular to the intersection normal, and other blended or averaged directions around the normals (stroking algorithm). One selected sweep direction can be along the intersection normal. After selecting the sweep directions, the candidate poses are computed by sweeping along the selected sweep directions. Computing the candidate poses can include processing that smooths the transition from the follower pose to the candidate poses. FIG. 1A and FIG. 1B provide a visual representation that shows an example of different sweep directions.

In a second phase, an approximate target pose is determined. For computing the approximate target pose, the distance to the leader pose can be computed for each of the candidate poses. These distances can be used as weights to blend the sampling sweep directions of the candidate poses. The approximate target pose can trade distance minimization for temporal coherence. To increase temporal coherence, the blended sweep direction can be blended with the corresponding sweep directions of previous simulation steps, where the number of simulation steps to review can be specified. The blended sweep direction can then be used as a final sweep direction that is used to compute a final candidate pose, referred to as the approximate target pose.

Figure 4:
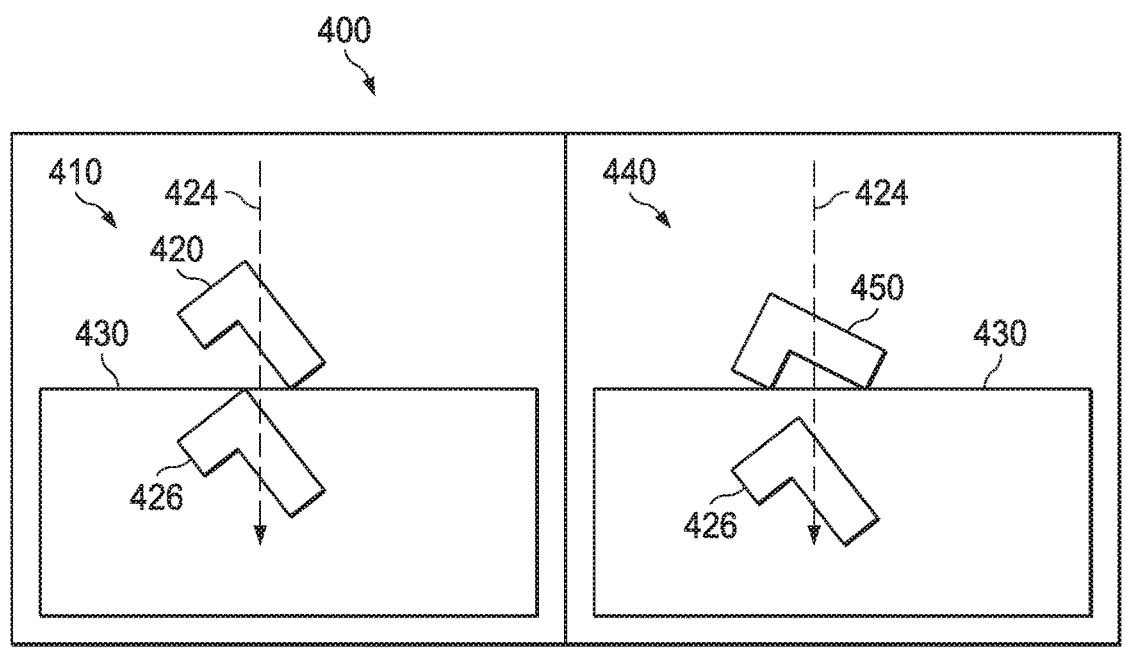
FIG. 4 is an illustration visually representing refining a target pose.

In a third phase, the approximate target pose is modified to provide a refined target pose. A rigid body algorithm can be utilized to refine the approximate target pose such as represented in FIG. 4, so that it is placed close to or at the surface of the obstruction. This can be achieved by introducing a system of jointed rigid bodies to represent the geometry of the follower pose and simulating it forwards in time with rigid body algorithms until a steady state is achieved. More specifically, the jointed rigid body ensemble can be driven against the surface normal with a joint drive that discourages lateral movement relative to the surface normal, e.g., stroking movement.

The follower pose to target pose analysis can represent movement in 2D or 3D. In addition, the approximate target pose can be rotated along one or more of the dimensional axis, such as under an applied rotational force, to reduce the distance between the approximate target pose and the leader pose. The rotational aspect of the applied rotational force can be modeled by using rigid body physics to push the approximate target pose with a linear force which, upon contact with the obstruction, can result in a rotational force to change the orientation of the approximate target pose relative to the surface of the obstruction. The rotated approximate target pose becomes a refined target pose. The linear movement of the rigid body can be constrained to move along the rotational force direction. By projecting the rigid body into the future through one or more simulation steps, equilibrium of the refined target pose can be computed as if it had been pushed against the surface of the obstruction. For example, an outstretched hand whose fingertips are stretched toward an obstruction can be rotated through a series of simulation steps so that the palm is against the surface of the obstruction as opposed to the fingertips. This can provide a more realistic movement to improve the visual quality experienced by the user.

The simulated environment may want to maintain the orientation of the leader pose in the refined target pose. An angular drive force can be used to push or rotate the refined target pose towards the orientation of the leader pose. The simulated environment can use application supplied parameters to balance the linear/rotational force and the angular drive force on the refined target pose. For example, touching a touch screen within the simulated environment can result in the angular drive dominating to maintain the leader pose orientation since it is likely the user intends to touch the screen with their fingertips, while the rotational force can dominate when simulating a door being pushed opened where it is likely the user intends the palm to push at the door. In some aspects, the orientation can also be constrained by external constraints. For example, a hand may or may not be able to rotate to present the palm towards the door due to the positioning, torque, and flexibility parameters of the fingers, wrist, arm, and body to which the hand is attached.

In a fourth phase, the computed steady state refined target pose can be used for the follower pose. The fourth phase algorithm can, in some aspects, allow the lateral movement to overshoot the refined target pose (overshoot movement) when that overshoot enables the follower pose to pass obstacles, such as edges, more easily, e.g., preventing the follower pose from getting stuck on an obstacle. In another aspect, contact friction between the surface of the obstacle and the follower pose can be reduced, such as to zero to eliminate side effects from rolling, sticking, or other friction related forces that can affect the refined target pose. In other aspects, as the refined target pose interacts with the obstruction, contact restitution can be reduced to avoid contact bounces. The friction coefficient parameter and contact restitution coefficient parameter can be adjusted to various values to achieve the result intended by the simulated environment.

The fourth phase can utilize rigid body joint drives to propel the jointed ensemble representing the follower pose forwards in time for a single simulation step. More specifically, the follower pose can be driven from its current state towards the refined target pose, and can be passed forward to the next simulation step as the new follower pose.

When the leader pose moves from an obstructed position to a non-obstructed position, a direct tracking movement algorithm can be used to minimize computational resources. In order to utilize the direct tracking algorithm, the follower pose can be in an approximate orientation of the leader pose. A transition algorithm can be used to provide a smooth transition from the current follower pose to the current leader pose. This algorithm can use direct tracking values, such as a time parameter, so that the follower pose will continue to use the blocking and stroking algorithms described herein, e.g., the first through fourth phase algorithms, to track the leader pose until the specified time has elapsed and then the follower pose can switch to the direct tracking algorithm. In another aspect, the direct tracking values can include a constant velocity parameter that can be utilized to move the follower pose towards the leader pose. This can prevent sudden jumps of the follower pose.

Figure 3:
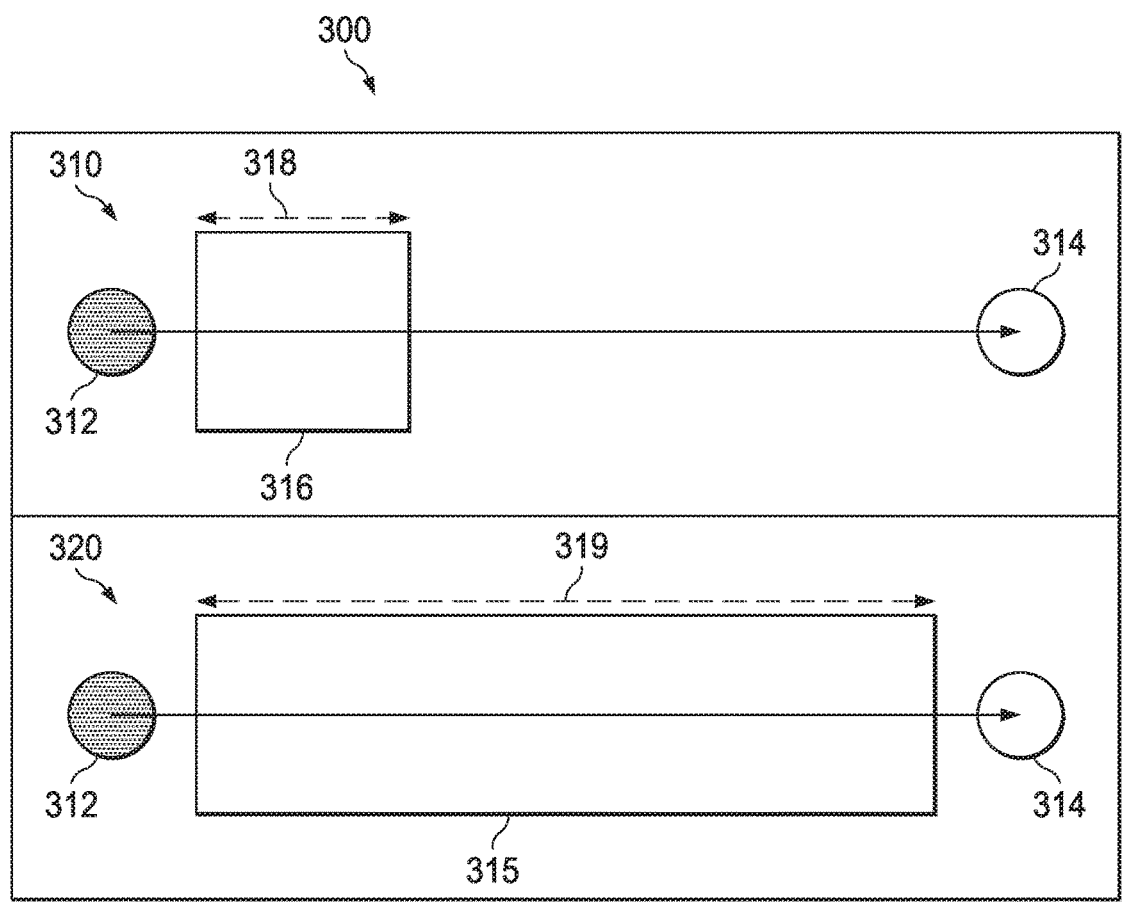
FIG. 3 is an illustration visually representing a method analyzing final pose ghosting.

A ghosting threshold can also be utilized. In situations where a leader pose has moved through an obstruction, is not currently within an obstruction, and where the follower pose and the leader pose have the obstruction between them, then the ghosting threshold can indicate whether the follower pose will move directly to the leader pose in a snap algorithm, e.g., instantaneous movement, or the follower pose will stop at the surface of the obstruction. FIG. 3 provides an example of employing a ghosting threshold.

The ghosting threshold defines the thickness or distance that the follower pose can travel through an obstruction to snap to the leader pose. The ghosting thickness refers to the distance traveled through the obstruction which may not be the same as the distance between the follower pose and the leader pose. When the ghosting thickness through the obstruction is equal to or less than the ghosting threshold, then the follower pose is allowed to snap to the leader pose, e.g., the obstruction is ignored. Other factors can prevent this snap type movement, such as external constraints. When the ghosting thickness through the obstruction is greater than the ghosting threshold, then the follower pose is blocked from moving toward the leader pose.

The method, in its various aspects, can use one or more, or a combination, of parameters as inputs to determine the final refined target pose. Parameters can be grouped by a set of parameters that describe the sweeps that can be used to compute the candidate poses, for example, the number of candidate poses, the blended sweep angles to utilize, and the number of previous simulation steps to use in the temporal smoothing. A second set of parameters can describe the rigid body algorithm that can be used to compute the refined target pose, for example, the physics values and parameters that are to be used, such as the value of gravity and the value of a magnetic field. A third set of parameters can describe the rigid body algorithm that can drive the follower pose from the current position to the refined target pose, for example, the distance to move the follower pose within the simulation step can be dependent on the FPS parameter.

Turning now to the figures, FIG. 1A is an illustration of a diagram, referred to as candidate pose analysis 100, that visually represents an example of a method for analyzing candidate poses in a 2D environment that includes an obstruction 110. Candidate pose analysis 100 illustrates three sweep directions in addition to an original sweep direction between leader pose 115 and original follower pose 120. In a 3D environment such as illustrated in FIG. 1B, additional sweep directions can be analyzed. For example, ten sweeps can be used for a 3D environment. Performing a large number of sweeps can be computationally impractical. As such, the number of sweep directions to analyze can be based on historical data and provide a balance between results and processing time. The same number of sweep directions can be used regardless of the shape of the obstruction 100. For example, the same number of sweep directions can be used for a convex obstruction and a concave obstruction. Alternatively, the number of sweeps to use can vary based on the shape of the obstruction.

A sweep is performed by projecting the shape or geometry of the original follower pose 120 at its current orientation along the vector that goes from the original follower pose 120 to the leader pose 115. Leader pose 115 is the requested position of the character or object, such as the user thrusting their hand forward through obstruction 110. The original follower pose 120 is the position of the character or object that is being manipulated or moved, such as an avatar's hand.

Leader pose 115 is located within the surface constraints of the obstruction 110 and original follower pose 120 is located above the obstruction 110. Original follower pose 120 may not be moved directly to the position of leader pose 115 as that would violate the physics-based constraints of obstruction 110 and would degrade the visual experience of the user, e.g., break the VR illusion. Therefore, candidate poses from which a target pose can be selected are computed using temporary follower poses and sweep directions.

Temporary follower poses 122, 124, 126, used to generate the candidate poses along select sweep directions, can be determined by moving leader pose 115 along perpendicular directions from intersectional normal 142 until the leader pose 115 is completely outside of the surface of obstruction 110. Intersectional normal 142 is a normal on the same side of obstruction 110 as original follower pose 120. The resulting temporary follower poses 122, 124, 126, can be computed outside of the geometry of the obstruction 110 by computing a bounding sphere around the obstruction 110 and a bounding sphere around the original follower pose 120, sum the radii of the two bounding spheres, and placing the temporary follower poses 122, 124, 126, outside the sum of the radii.

Candidate poses can be computed by sweeping, along the selected sweeping directions perpendicular to the intersectional normal 142, the temporary follower poses 122, 124, 126, back towards the leader pose 115 until the respective temporary follower poses intersect the surface of the obstruction 110. From the intersected surfaces, surface normals 144 and 146 can be determined. With the sweeping, temporary follower pose 122 can produce a computed candidate pose 132 associated with intersectional normal 142, temporary follower pose 124 can produce a computed candidate pose 134 associated with surface normal 144, and follower pose 126 can produce a computed candidate pose 136 associated with surface normal 146. A negative sweep direction, represented by surface normal 148, is ignored since original follower pose 120 is proximate to surface normal 142 and a candidate pose with respect to surface normal 148 would result in that candidate pose ghosting through the obstruction. Ghosting scenarios are described further in FIG. 3.

As such, the resulting candidate poses are computed candidate pose 132, computed candidate pose 134, and computed candidate pose 136. Through additional analysis, one of the computed candidate poses 132, 134, and 136, is selected as a target pose. The target pose can be used as an approximate target pose in its current orientation or further refined, and utilized as the target of movement for original follower pose 120.

FIG. 1B is an illustration of a diagram, referred to as candidate pose analysis 160, that visually represents an example of a method for analyzing candidate poses in a 3D environment. Candidate pose analysis 160 includes an obstruction 162 shown as a solid cuboid, a leader pose 164 shown within obstruction 162, and a follower pose 166. Utilizing the current position of leader pose 164, ten sweep directions can be identified for ten candidate poses. Sweep 170 shows the direction of the primary sweep from follower pose 166 to leader pose 164 and is used as the first candidate sweep direction. Sweep 172 is the surface normal of obstruction 162 at the intersection point where sweep 170 intersects obstruction 162. Sweep 172 is used as the second candidate sweep direction.

Sweep 174, sweep 176, sweep 178, and sweep 180 form a plane that has sweep 172 as its normal. These five sweep directions can also be used to define the Cartesian coordinate system to be utilized for the remaining analysis. Sweep 174 and sweep 178 are perpendicular to a plane formed by sweeps 172, 176, and 180, with respective vectors in opposite directions. Likewise, sweep 180 and sweep 176 are perpendicular to a plane formed by sweeps 172, 174, and 178, with respective vectors in opposite directions.

Sweep 182 is computed by averaging sweep directions of sweep 172, sweep 174, and sweep 180. This effectively locates sweep 182 at a forty-five-degree angle from the Cartesian sweep directions. This allows the candidate poses to sample the approximate hemisphere defined by obstruction 162 and sweep 172, where the hemisphere can be modified using the surface shape of obstruction 162. Sweep 184, sweep 186, and sweep 188 are similarly computed utilizing the other respective Cartesian sweeps. Sweep 184 is computed from an average of sweep 172, sweep 174, and sweep 176. Sweep 186 is computed from an average of sweep 172, sweep 176, and sweep 178. Sweep 188 is computed from an average of sweep 172, sweep 178, and sweep 180.

Figure 2:
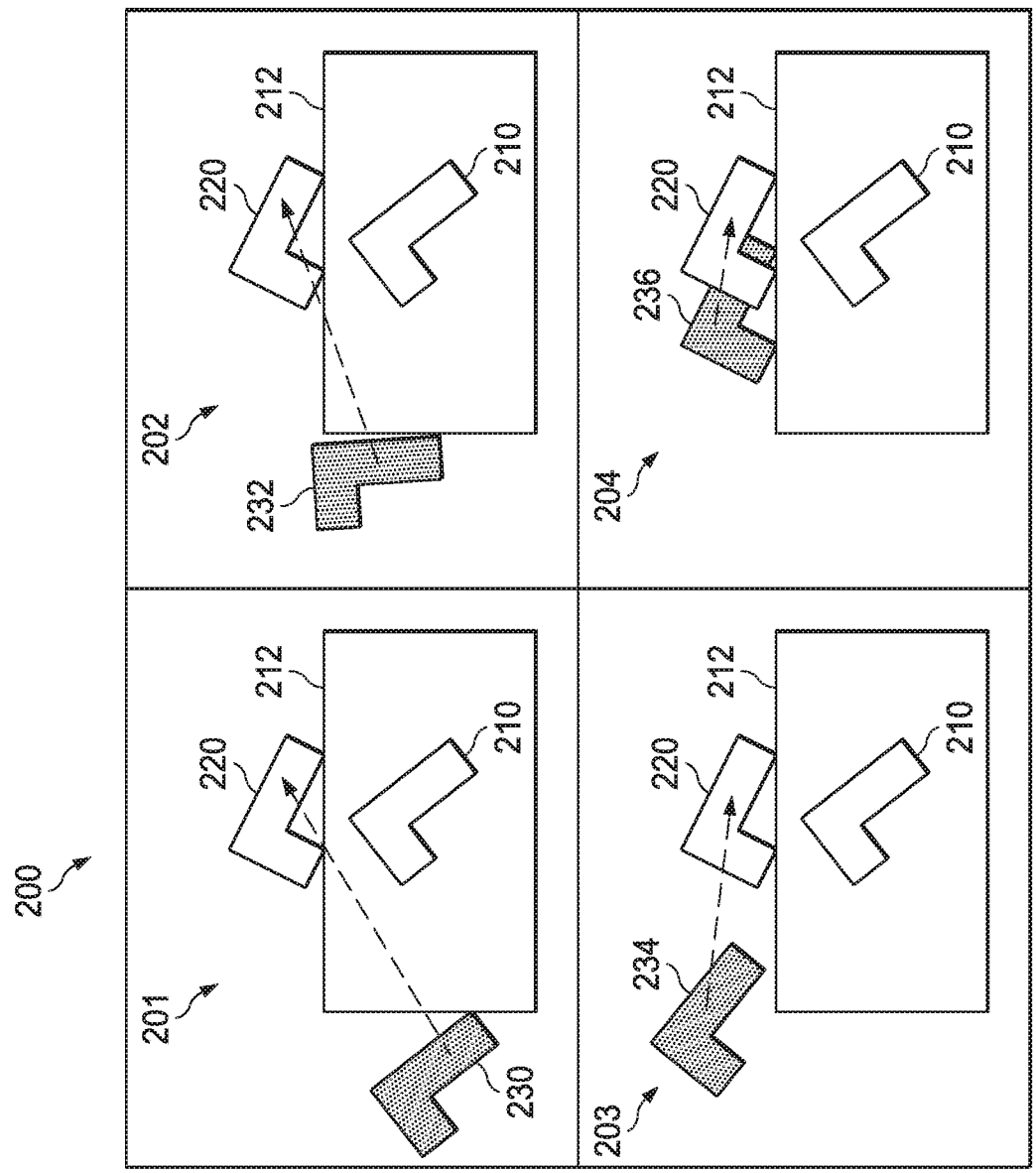
FIG. 2 is an illustration visually representing an example method for determining a final pose.

FIG. 2 is an illustration of four diagrams, collectively referred to as final pose analysis 200, visually representing a method for determining a final pose. The four diagrams illustrate a time elapsed four step simulation. Diagram 201 represents original follower pose 230, diagram 202 represents a first intermediate simulation step with a follower pose 232, diagram 203 represents a second intermediate simulation step with a follower pose 234, and diagram 204 represents a last simulation step with a follower pose 236. The diagrams 201, 202, 203, 204, represent the same simulated environment with a leader pose 210 positioned within the surface boundaries of an obstruction 212, and a refined target pose 220 that has been computed by the processes described herein.

Diagram 201 represents original follower pose 230 and refined target pose 220 selected from previously determined candidate poses. Diagram 202 represents moving follower pose 232 towards refined target pose 220 using, for example, blocking and stroking algorithms. Follower pose 232 does not violate the surface of obstruction 212. In addition, follower pose 232 has been rotated by the rotational force applied by, for example, a rigid body interaction.

Diagram 203 represents follower pose 234 rotated back to the orientation of refined target pose 220. Since obstruction 212 is no longer between follower pose 234 and refined target pose 220, the angular drive force is now greater than the rotational force that was applied in diagram 202. Diagram 204 represents follower pose 236 converging with refined target pose 220. An operation of a physics engine, such as drive to pose, can be employed for the final pose analysis 200.

For the final pose analysis 200, the follower and target poses can be processed as a single object or as a system of constrained bodies or ensemble of parts that create a complicated shape. For example, the follower poses can represent a hand composed of multiple parts that each have their own target pose. The number of target poses needed depends on the number of parts representing the hand. The thumb can be represented by two parts, each finger can be represented by three parts, and the palm a single part of the hand. Accordingly, 15 follower and target poses would be used to determine the final pose and realistically define how the fingers of a hand would respond on a surface of the obstruction 212.

FIG. 3 is an illustration of two diagrams, collectively referred to as ghosting final pose analysis 300, visually representing a method analyzing final pose ghosting. Diagram 310 demonstrates a follower pose 312, a leader pose 314, and an obstruction 316 located between them. Obstruction 316 has a ghosting thickness represented by dashed line 318.

Diagram 320 demonstrates follower pose 312, leader pose 314, and an obstruction 315 located between them. Obstruction 315 has a ghosting thickness represented by dashed line 319. Utilizing a ghosting threshold compared to the ghosting thickness represented by dashed lines 318 and 319, a determination can be made whether to snap follower pose 312 to leader pose 314 in diagram 310 or 320, or to utilize blocking and stroking algorithms to move follower pose 312. In diagram 310 and 320, the distance between the follower pose 312 and the leader pose 314 are the same and is not typically utilized for ghosting analysis. For example, the value of dashed line 318 can be less than the ghosting threshold and the snap algorithm can be used in diagram 310. In contrast, the value of dashed line 319 can be greater than the ghosting threshold and the snap algorithm is not employed. In aspects where the ghosting analysis indicates that a snap algorithm can be utilized, i.e., the ghosting distance is less than the ghosting threshold, other constraints, such as external constraints, can be used to prevent the use of the snap algorithm.

FIG. 4 is an illustration of two diagrams, collectively referred to as a refined target pose analysis 400, visually representing the application of a rotational force on a target pose, such as a hand rotating from fingertips to palm against a tabletop. Diagram 410 illustrates an approximate target pose 420 along the sweep direction 424 for leader pose 426 shown within obstruction 430. Diagram 440 illustrates a refined target pose 450 resulting from applying a rotational force on approximate target pose 420. The rotational force in this example is greater than an angular drive force to keep refined target pose 450 in the same orientation as leader pose 426. Other constraints can be considered when determining the refined target pose 450, for example, surface friction (measured by the coefficient of friction), contact restitution (measured by the coefficient of restitution), external constraints (such as articulated connections of the follower pose), rigid body constraints, and other environment constraints (such as a simulated environment of outer space, water, and other environments).

For the refined target pose analysis 400, the target poses can be processed as a single object or as a system of constrained bodies as discussed above with respect to the final pose analysis 200. Accordingly, the approximate target pose 420 and the refined target pose 450 can be represented by multiple systems constrained together to realistically define how the fingers of a hand would rest on the surface of the obstruction 430.

Figure 5:
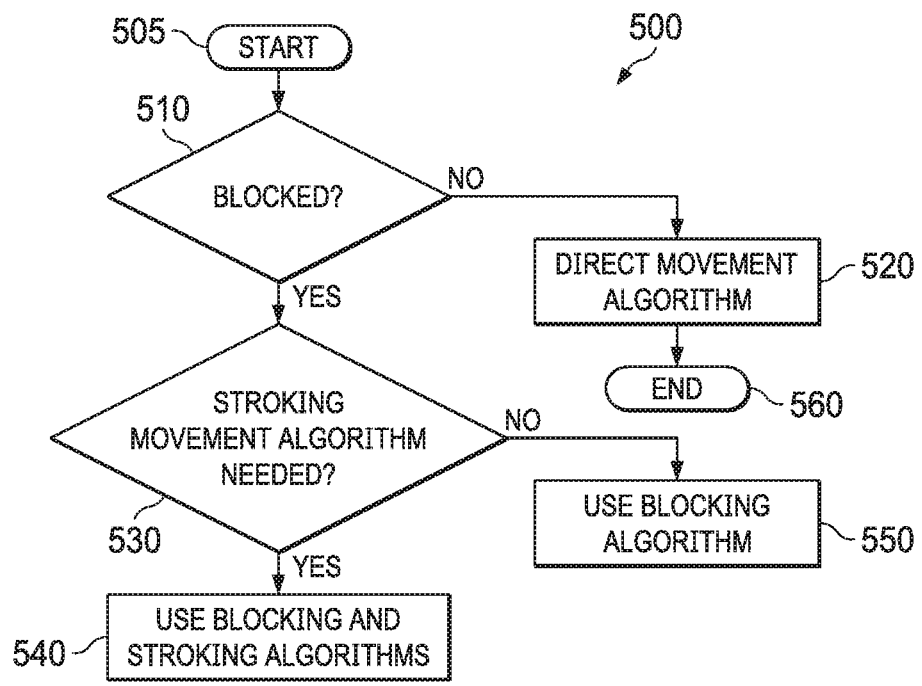
FIG. 5 is an illustration of a flow diagram of an example of a method to determine a type of movement algorithm for moving an object in a simulated environment.
Figure 7:
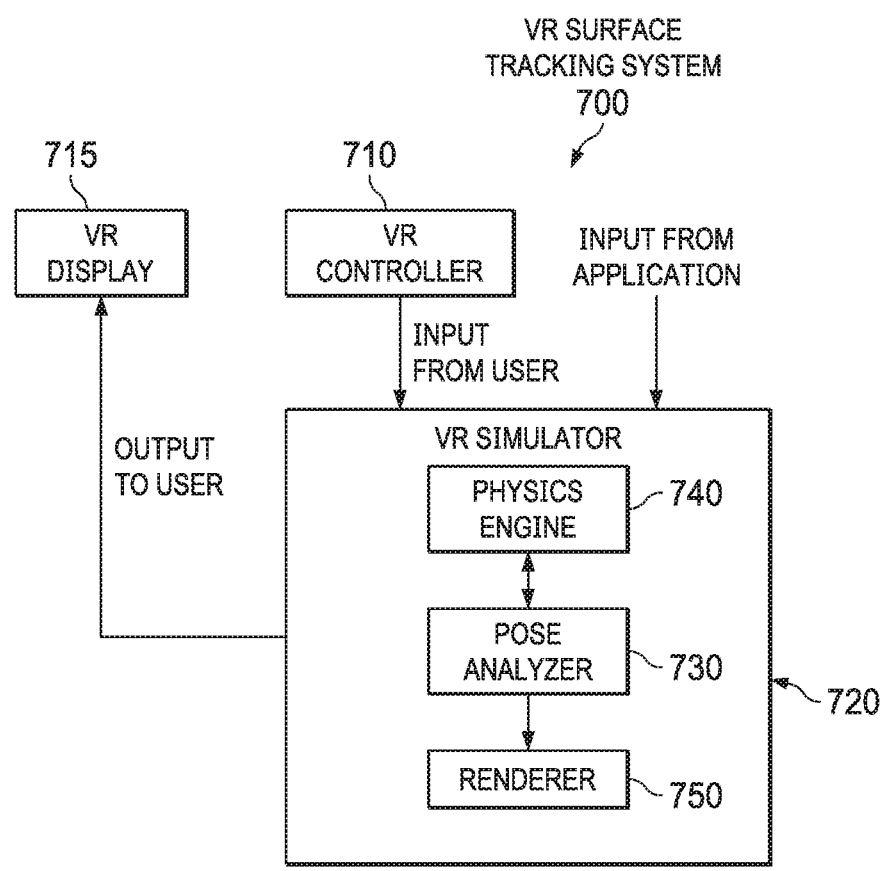
FIG. 7 is an illustration of a block diagram demonstrating an example virtual reality surface tracking system.

FIG. 5 is an illustration of a flow diagram of an example of a method 500 to determine a type of movement algorithm for moving an object in a simulated environment. The object, for example, can be a user's hand that the user is moving in their physical space. Method 500 determines the type of movement algorithm or algorithms to use for follower pose to leader pose movement in order to replicate the actual hand movement in the simulated environment. The type of movement algorithm can be a direct, blocking, stroking, snap, transition, or a combination of one or more of these movement algorithms. Method 500 can be carried out by a computing system capable of analyzing object movement within a simulated environment while employing physics-based constraints, for example, the computing system as shown in FIG. 7. Method 500 begins in step 505.

In decision step 510, a determination is made whether the follower pose to leader pose movement is blocked by an obstruction. When the result of the determination step is no, i.e., movement is unblocked, then method 500 proceeds to step 520 where a direct movement algorithm is used. When switching from another type of movement algorithm to the direct movement algorithm, parameters can be used to determine if an additional movement algorithm(s) should be used for the transition. For example, time delay, distance parameters, or both can be used to determine a transition algorithm is beneficial when switching from a blocking/stroking movement algorithm to the direct movement algorithm. The time delay parameter can specify a time value, a number of simulation steps, a number of frames, and other values that can be used to delay when the movement algorithm switch is made in order to provide a smoother visual movement transition. The distance parameter can be used to indicate how far an object can travel prior to switching from the blocking/stroking movement algorithms to the direct movement algorithm.

When decision step 510 resultant is yes, i.e., there is an obstruction, then method 500 proceeds to decision step 530. In decision step 530, a determination is made if a stroking movement algorithm is needed. The determination can be based on the size of the obstruction and the size of the object being moved. A comparison between a sweep mode ratio and a sweep mode parameter can be used for the size analysis. The sweep mode ratio is a ratio of the size of the obstruction over the size of the moving object (or the size of bounding spheres for the respective object and obstruction), i.e., an analysis of the size of the moving object compared to the size of the obstruction. The sweep mode ratio can indicate whether the blocking algorithm or a combination of the blocking and stroking algorithms can be utilized to determine the movement of the follower pose towards the leader pose.

When a determination is made that the stroking movement algorithm is needed, the method 500 continues to step 540 where blocking and stroking algorithms are used. The decision step 530 resultant can be "Yes" when the sweep mode ratio is 'greater than' than the sweep mode parameter. As such, the obstruction is of a sufficient size compared to the moving object to warrant utilizing the blocking and stroking algorithms, for example, a hand touching a tabletop.

When a determination is made that the stroking movement algorithm is not needed, the method 500 continues to step 550 where the blocking algorithm is used. The decision step 530 resultant can be "No" when the sweep mode ratio is 'less than or equal to' the sweep mode parameter. As such, the obstruction is not of a sufficient size as compared to the moving object and the blocking algorithm is utilized by itself. For example, a hand touching a control knob. At the end of steps 520, 540, and 550, the method 500 proceeds to step 560 and ends.

Figure 6:
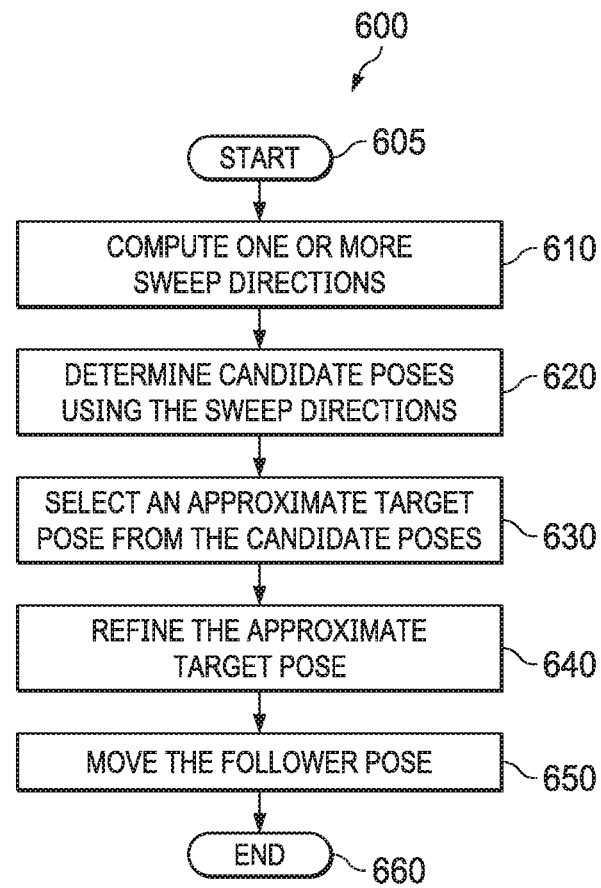
FIG. 6 is an illustration of a flow diagram of an example of a method for determining a target pose when there is an obstruction between the follower pose and the leader pose.

When creating a simulated environment, a standard tracking algorithm, such as a direct movement algorithm, can be used to move a follower pose to a leader pose when there is not an obstruction between the two poses. In situations where there is an obstruction or part of an obstruction between the follower pose and the leader pose, a standard direct tracking algorithm cannot be utilized. FIG. 6 is an illustration of a flow diagram of an example of a method 600 for determining a target pose when there is an obstruction between the follower pose and the leader pose. Method 600 computes multiple candidate poses, selects a target pose, and refines the target pose utilizing environment constraints. Method 600 can be carried out by a computing system capable of analyzing object movement within a simulated environment while employing physics-based constraints, for example, the computing system as shown in FIG. 7. Method 600 starts at step 605.

In step 610, one or more sweep directions are computed. Sweep directions can be computed from the follower pose to the leader pose using the surface normals of the obstruction as a guide. FIG. 1A and FIG. 1B provide examples of computing sweep directions for 2D and 3D simulated environments.

Candidate poses are determined in step 620 using the sweep directions. The sweep directions can be used to place the candidate poses close to a surface of the obstruction without violating the physics-based constraints of the surface. In some aspects, the candidate poses can utilize blending and averaging algorithms. For example, blending and averaging algorithms can be utilized in scenarios where, due to an irregular shaped surface of the obstruction, several candidate poses are placed close to or overlapping one another. The blending and averaging algorithms can produce a candidate pose that improves the visual experience. In addition, the candidate poses can blend similar located candidate poses from past simulation steps to provide temporal consistency between simulation steps. The temporal consistency can improve the smoothness of the visual experience as the object moves.

In step 630, an approximate target pose is selected from the candidate poses. The approximate target pose selection can utilize information from previous simulation steps as well as other factors to determine the best fit candidate pose. Temporal coherence, e.g., the reduction of jitter or jumpiness of the objects in the VR scene, is one factor that can be used when selecting the approximate target pose in order to maintain the VR visual experience for the user. Temporal coherence can be enhanced by blending the sweep directions for the candidate poses from previous simulation steps with the sweep directions for the computed candidate poses during the current simulation step. One or more additional factors can also be used in the analysis to select the approximate target pose. For example, one or more of the sweep directions can be blended for computing candidate poses, from which the approximate target pose can be selected. The additional blending can provide a smoother movement as perceived by the user. Further blending can also be conducted utilizing the sweep directions. Two or more sweep directions can be blended together to determine a final sweep direction. This can be useful when the leader pose is moving fast, and as the follower pose continues to chase the leader pose, small changes in direction between the two poses can be blended and smoothed within the simulation step.

In a step 640, the approximate target pose is refined to a refined target pose. The approximate target prose can be refined by applying rotational forces, angular drive forces, and other constraints. The refined target pose can result in an adjusted position and an adjusted orientation. The refined target pose can be oriented to mimic the leader pose unless another force or constraint prevents such orientation.

The refining can include adding lateral movement to obtain the refined target pose. Lateral movement can provide a spring or damper style adjustment logic, which can allow some flexibility in the movement, for example, around small edges on the obstruction. The lateral movement can also aid in providing a smoother visual experience across multiple simulation steps by providing temporal coherence. The lateral movement can include overshoot movement, such that the target pose overshoots, e.g., moves past, a candidate pose due to obstruction and environment constraints.

The friction coefficients and the contact restitution coefficients of the moving object and obstruction can be adjusted. For example, the respective coefficients can be reduced to zero to eliminate additional complexity as the moving object touches the surface of the obstruction. Alternatively, the coefficients can be partially reduced to reduce the impact of those constraints on the overall process.

The approximate target pose can also be rotated and oriented by a rotational force as it pushes against the surface of the obstruction, such as a hand rotating from fingertips to palm against a door. The approximate target pose can also have an angular drive force applied that can tend to force the approximate target pose to better approximate the orientation of the leader pose, such as keeping the hand oriented with the fingertips against the obstruction. The rotational force and the angular drive force are balanced by the VR simulator. As each force dominates, the approximate target pose can change its orientation. External constraints is another example of refining that can be applied to the approximate target pose. An external constraint can be articulated connections to the object, fluid dynamics, and other simulated environment factors.

The approximate target pose can be represented as a single rigid figure or a multipart representation of jointed rigid bodies. In a multipart representation, the approximate target pose can act as a flexible object and respond as a conforming hand, wherein the knuckles move as the hand presses down on surface of an obstruction.

The follower pose is moved to the refined target pose in step 650. The amount of movement the follower pose exhibits to the refined target pose can depend on the velocity of the user's movement, and the size of the simulation steps (for example, measured in FPS). Other simulated environment constraints, such as if the follower pose is moving in air or under water, can also affect the amount of movement. The follower pose may move part of the way or the full way to the refined target pose. The follower pose and the target pose can be represented as a rigid object or as a flexible object having as system of constrained bodies. A new follower pose can be rendered based on the refined target pose. For example, the refined target pose or some state between the previous follower pose and the refined target pose can be rendered as the new follower pose The method 600 continues to step 660 and ends.

FIG. 7 is an illustration of a block diagram demonstrating an example VR surface tracking system 700. VR surface tracking system 700 can be used as part of a VR simulator to track the movement of an object through the simulated environment and adjust the movement of the object as it encounters obstacles within the simulated environment. VR surface tracking system 700 includes a VR controller 710, a VR display 715, and a VR simulator 720. VR controller 710, VR display 715, and VR simulator 720 can be separate device that are communicatively coupled through wired or wireless connections. For example, the VR simulator 720 or at least a portion thereof can be implemented on a cloud-based platform and be used to provide game streaming VR simulator 720 can also be combined with VR display 715 and VR controller 710 into a single integrated VR device capable of executing the processes and functions described.

VR controller 710 is capable of detecting user movement and communicating that movement to VR simulator 720. VR controller 710 can be part of VR display 715, such as a VR head set that can detect eye and head movement. VR controller 710 can be one or more separate controllers as well, for example, a hand held sensor, one or more cameras, a motion detector, and other haptic and body sensor devices. Accordingly, VR controller 710 represents one or more VR controller.

VR display 715 is capable of receiving and displaying a simulated scene from the VR simulator 720. VR display 715 can be one or more of various displays, monitors, and other devices capable of showing a 2D or 3D scene. VR display 715 can be associated with a data storage device, such as a hard drive, cloud storage, server, USB memory, and other storage mediums.

VR simulator 720 can be implemented as hardware, software, or a combination thereof. VR simulator 720 can be a software application executing on a GPU, CPU, or other processor, or embedded in circuitry of a computing system. VR simulator 720 can utilize zero, one, or more of such processors. VR simulator 720 can also be encapsulated as a software application, for example, in an application library, a dynamic link library (DLL), an application function, an application module, a graphics library or driver, a ROM module, and a code segment.

VR simulator 720 can be located in a server, data center, cloud environment, or other computing system, for example, a laptop, tablet, and smartphone. VR simulator 720 can be located proximate to VR controller 710 and VR display 715, be located a distance away, be part of VR controller 710 or VR display 715, or a combination thereof. The communications between VR simulator 720, VR controller 710, and VR display 715 can be by various conventional transmission standards and be wired, wireless, or other conventional transmission means.

VR simulator 720 includes a pose analyzer 730, a physics engine 740, and a renderer 750. VR simulator can receive input parameters from VR controller 710, such as parameters pertaining to user movement, and input parameters from an application, such as blocking thresholds, FPS, lateral overshoot parameters, ghosting threshold, and other parameters. The application can be a video game application. In some aspects, the application is executing on the VR controller 710 and the application parameters are received from VR controller 710. In other aspects, the application can execute on the VR simulator and the application parameters are received from the application. In other aspects, the application can execute on another computing system and the application parameters can be received from the other computing system. For example, VR simulator 720 can receive, from the appropriate application source, the simulated environment parameters, the rigid body physics values, the scene geometry, the ghosting threshold, the lateral movement value, the targeted FPS, the time delay, the distance parameter, and other input values and parameters.

Pose analyzer 730 can utilize the scene geometry, along with the simulated environment and the movement by the user to determine the follower pose and leader pose for the current simulation step. Analyzing the VR geometry can detect whether an obstruction is blocking the follower pose from utilizing a direct tracking algorithm to move to the leader pose. The pose analyzer 730 can then utilize one or more movement algorithms, such as the blocking algorithm, stroking algorithm, snap algorithm, transition algorithm, and direct tracking algorithm to compute candidate poses for the requested movement. Pose analyzer 730 can select a candidate pose as an approximate target pose and refine the target pose by applying zero, one, or more constraints and forces on the approximate target pose. The result is a refined target pose that can be provided to renderer 750 for the follower pose. The pose analyzer 730 can provide the refined target pose according to the methods disclosed herein, such as represented in FIG. 5 and FIG. 6. The pose analyzer 730 can cooperate with the physics engine 740 to compute the refined target pose. The physics engine 740 can be a conventional physics engine employed in VR simulators.

Renderer 750 can receive the refined target pose information from the pose analyzer 730, along with other supporting information, and render a scene for the current simulation step. Renderer 750 can determine how much movement the follower pose experiences within the current simulation step. Utilizing the velocity of the movement, the simulated environment factors, and other movement factors, the follower pose can be rendered partly toward the leader pose or fully at the leader pose. Renderer 750 can then output the scene to VR display 715 for viewing.

The renderer 750 can be a cloud-based renderer that provides game streaming to the VR display 715. One or more components of the VR simulator 720 can also be cloud-based. For example, the pose analyzer 730, the physics engine 740, and the renderer 750 can be implemented on one or more cloud-based server.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. The processors or computers can be part of GPU racks located in a data center. The GPU racks can be high-density (HD) GPU racks that include high performance GPU compute nodes and storage nodes.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method to determine a follower pose in a virtual reality (VR) simulator during a simulation step, comprising:
    computing one or more current candidate poses utilizing input parameters, wherein each of the current candidate poses is a temporal projection of a follower pose along a respective sweep direction towards a leader pose, and wherein an obstruction is located between the follower pose and the leader pose in a simulated environment;
    selecting a target pose from the one or more current candidate poses;
    refining the target pose utilizing physics-based constraints and the input parameters, wherein the physics-based constraints use a surface of the obstruction; and
    rendering a new follower pose based on the refined target pose.

2. The method as recited in claim 1, wherein the respective sweep direction is determined utilizing an intersection normal corresponding to the follower pose and directions perpendicular to the intersection normal.

3. The method as recited in claim 1, wherein the leader pose is located within a boundary of the surface of the obstruction.

4. The method as recited in claim 1, wherein the VR simulator is executed at least partially on one or more graphics processing units (GPU).

5. The method as recited in claim 1, wherein the input parameters are received from a VR controller and a software application.

6. The method as recited in claim 1, wherein the input parameters include one or more of the follower pose, the leader pose, the obstruction, a friction coefficient of the surface, a contact restitution coefficient of the surface, an external constraint, values of a rigid body algorithm, or a direct tracking value.

7. The method as recited in claim 1, wherein the computing utilizes a blocking algorithm when a sweep mode ratio is equal to or less than a sweep mode parameter, and utilizes the blocking algorithm and a stroking algorithm when the sweep mode ratio is greater than the sweep mode parameter.

8. The method as recited in claim 1, wherein the selecting further comprises:
blending previous candidate poses computed in previous simulation steps with the one or more current candidate poses.

9. The method as recited in claim 1, wherein the selecting further comprises:
blending the respective sweep directions from each of the one or more candidate poses, and including a candidate pose utilizing the blended respective sweep direction as one of the one or more candidate poses.

10. The method as recited in claim 1, wherein the refining further comprises:
rotating the target pose under an applied rotational force when the target pose is proximate to the surface of the obstruction.

11. The method as recited in claim 10, wherein the refining further comprises:
reducing the applied rotational force by an angular drive force of the target pose.

12. The method as recited in claim 1, wherein the refining utilizes one or more of external constraints, a lateral movement, a friction coefficient of the surface of the obstruction, or a contact restitution coefficient of the surface of the obstruction.

13. The method as recited in claim 1, wherein the rendering further comprises:
switching to a direct tracking algorithm when the obstruction is no longer between the follower pose and the leader pose.

14. The method as recited in claim 1, wherein the target pose and the refined target pose represent a flexible object of multiple constrained bodies.

15. The method as recited in claim 14, wherein each of the multiple constrained bodies has a unique target pose and a unique refined target pose.

16. A computer program product having a series of operating instructions stored on a non-transitory computer-readable medium that directs a data processing apparatus when executed thereby to perform operations to determine a follower pose in a virtual reality (VR) simulator during a simulation step, the operations comprising:
computing one or more candidate poses, wherein each of the candidate poses is a temporal projection of a follower pose along a respective sweep direction towards a leader pose, and wherein an obstruction is located between the follower pose and the leader pose in a simulated environment;
selecting a target pose from the one or more candidate poses;
refining the target pose utilizing physics-based constraints; and
rendering a new follower pose based on the refined target pose.

17. A system to render a virtual reality (VR) scene, comprising:
a VR controller, operable to transmit user parameters corresponding to movement of a user; and
a VR simulator, operable to receive and use the user parameters and application parameters to render a scene of a simulated environment utilizing one or more movement algorithms based on an interaction of a leader pose with an obstruction, wherein the leader pose represents the movement of the user in the simulated environment and the obstruction is at least partially between a follower pose and the leader pose in the simulated environment.

18. The system as recited in claim 17, wherein the VR simulator utilizes one or more of a graphics processing unit (GPU) or a central processing unit (CPU).

19. The system as recited in claim 17, wherein the operations of the VR simulator are encapsulated as one or more of an application library, a dynamic link library (DLL), a function, a module, a graphics library, a ROM module, and a code segment.

20. The system as recited in claim 17, further comprising:
a VR display, operable to receive the scene from the VR simulator.

21. The system as recited in claim 17, wherein the VR simulator further comprises:
a pose analyzer, operable to compute candidate poses utilizing the follower pose, the leader pose, previously computed candidate poses, the user parameters and the application parameters; and
a renderer, operable to generate the scene utilizing an output of the pose analyzer.

22. The system as recited in claim 17, wherein the VR simulator is located in a cloud environment.

23. The system as recited in claim 17, wherein the movement algorithms include a blocking algorithm, a stroking algorithm, a direct algorithm, a transition algorithm and a snap algorithm.

* * * * *